(12) United States Patent
Tan et al.

(10) Patent No.: US 12,731,510 B2
(45) Date of Patent: Sep. 8, 2026

(54) TRANSMISSION ADJUSTMENT STRUCTURE, CASING AND TILED DISPLAY DEVICE

(71) Applicants: BOE MLED Technology Co., Ltd., Beijing (CN); BOE Technology Group Co., Ltd., Beijing (CN)

(72) Inventors: Jianbai Tan, Beijing (CN); Jiaxing Yuan, Beijing (CN); Shaofei Guo, Beijing (CN); Shipeng Wang, Beijing (CN); Chao Tian, Beijing (CN); Jianfeng Wang, Beijing (CN); Yushu Gan, Beijing (CN)

(73) Assignees: BOE MLED Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 298 days.

(21) Appl. No.: 18/283,821

(22) PCT Filed: Oct. 31, 2022

(86) PCT No.: PCT/CN2022/128722

§ 371 (c)(1),
(2) Date: Sep. 25, 2023

(87) PCT Pub. No.: WO2024/092435

PCT Pub. Date: May 10, 2024

(65) Prior Publication Data

US 2025/0078691 A1 Mar. 6, 2025

(51) Int. Cl.

| | |
|---|---|
| ***G09F 9/30*** | (2006.01) |
| ***F16M 11/18*** | (2006.01) |
| ***G09F 9/302*** | (2006.01) |

(52) U.S. Cl.
CPC .......... *G09F 9/3023* (2013.01); *F16M 11/18* (2013.01)

(58) Field of Classification Search
CPC ....... G09F 9/056; G09F 9/3023; F16M 11/18; F16M 11/043
See application file for complete search history.

(56) References Cited

U.S. PATENT DOCUMENTS 8,850,911 B2 * 10/2014 Jurjanz .................. F16D 23/12 74/56

FOREIGN PATENT DOCUMENTS

| | | | |
|---|---|---|---|
| CN | 205281995 U * | 6/2016 | ............. B23P 19/04 |
| CN | 106862636 A | 6/2017 | |
| CN | 108705856 A | 10/2018 | |

(Continued)

*Primary Examiner* — Zakaria Elahmadi

(57) ABSTRACT

A transmission adjustment structure includes: a shell, a rotation part, a transmission part, and a response part. An adjustment hole exposing one end of the rotation part is provided at a position on the shell corresponding to the rotation part, the other end of the rotation part is connected to the transmission part; a guide hole exposing one end of the response part is provided at a position on the shell corresponding to the response part, the other end of the response part is in contact with the transmission part; the rotation part is rotatable in response to controlling by an external tool on the end of the rotation part exposed by the adjustment hole; the transmission part is movable along a first direction in response to rotation controlling of the rotation part, the first direction is an extension direction of the transmission part.

20 Claims, 8 Drawing Sheets

(56) References Cited

FOREIGN PATENT DOCUMENTS

| | | | | | |
|---|---|---|---|---|---|
| CN | 209029005 | U | | 6/2019 | |
| CN | 111477118 | A | | 7/2020 | |
| CN | 112025689 | A | | 12/2020 | |
| CN | 217046349 | U | | 7/2022 | |
| KR | 101301050 | B1 | | 9/2013 | |
| KR | 102489223 | B1 | * | 1/2023 | ........... G09F 9/3026 |

* cited by examiner

TRANSMISSION ADJUSTMENT STRUCTURE, CASING AND TILED DISPLAY DEVICE

CROSS-REFERENCE TO RELATED APPLICATION

The present application is a U.S. National Phase Entry of International Application PCT/CN2022/128722 having an international filing date of Oct. 31, 2022, and entitled "Transmission Adjustment Structure, Casing and Tiled Display Device", the contents of which are hereby incorporated herein by reference in their entireties.

TECHNICAL FIELD

The present disclosure relates to the technical field of display, specifically to a transmission adjustment structure, a casing, and a tiled display device.

BACKGROUND

With rapid development of display technology, tiled display devices have been more and more widely used in large-scale places such as shopping malls, cinemas, stadiums, or the like. They not only solves technical problems of a high cost and difficult maintenance of a single large screen, but also has very high scalability, which can be suitable for displaying images of various sizes.

A tiled display device is formed by splicing multiple sub-display panel assemblies, and the above multiple sub-display panel assemblies are supported by a casing.

SUMMARY

Embodiments of the present disclosure provide a transmission adjustment structure, a casing, and a tiled display device.

In a first aspect, an embodiment of the present disclosure provides a transmission adjustment structure, including: a shell, a rotation part, a transmission part, and a response part, wherein an adjustment hole exposing one end of the rotation part is provided at a position on the shell corresponding to the rotation part, and the other end of the rotation part is connected to the transmission part; a guide hole exposing one end of the response part is provided at a position on the shell corresponding to the response part, and the other end of the response part is in contact with the transmission part; the rotation part is configured to rotate in response to controlling by an external tool on the end of the rotation part exposed by the adjustment hole; the transmission part is configured to move along a first direction in response to rotation controlling of the rotation part, and the first direction is an extension direction of the transmission part; and the response part is configured to move along a second direction in response to movement of the transmission part, the second direction intersects the first direction to adjust an amount of protrusion of the response part in the guide hole.

In some embodiments, the shell includes a limit groove, including a first limit plate and a second limit plate disposed oppositely, and a sidewall located between the first limit plate and the second limit plate, the rotation part includes an adjustment portion and a connection portion connected to the adjustment portion, the adjustment portion is located in the limit groove; the adjustment hole is located on the first limit plate of the limit groove to expose at least portion of the adjustment portion; a first via hole is formed on the second limit plate of the limit groove, and the connection portion extends along the first direction through the first via hole.

In some embodiments, one end of the adjustment portion close to the first limit plate has an annular-shaped cross-section parallel to the first limit plate, the annular shape has an inner contour and an outer contour; an orthographic projection of the inner contour on a plane on which the first limit plate is located is located in a region in which the adjustment hole is located; and an orthographic projection of the outer contour on the plane on which the first limit plate is located covers the adjustment hole.

In some embodiments, a first gasket is disposed between the adjustment portion and the first limit plate, and/or, a second gasket is disposed between the connection portion and the second limit plate.

In some embodiments, the shell further includes a first accommodation groove, which is communicated with the limit groove through the first via hole, the transmission part is located in the first accommodation groove, and the transmission part includes a first end face close to the first via hole, a second end face away from the first via hole, and a first side face located between the first end face and the second end face; an adaptation groove is formed on the first end face, an external thread is provided on the connection portion, and an internal thread adapted to the external thread of the connection portion is provided in the adaptation groove; a guide part is disposed in the first accommodation groove, at least one guide groove adapted to the guide part is provided on the first side face for the transmission part to move along the guide part, and the guide part extends along the first direction; the second end face faces the response part and is in contact with the response part, and the second end face is configured to push the response part to move along the second direction when the second end face moves along the first direction.

In some embodiments, an included angle between the second end face and a virtual plane is between 25° and 75°, and the virtual plane is perpendicular to the second direction.

In some embodiments, a third gasket is disposed between the first end face and the second limit plate.

In some embodiments, the guide part includes at least one convex portion disposed on a sidewall of the first accommodation groove, the at least one convex portion extending along the first direction; the at least one guide groove in one-to-one correspondence with the convex portion is provided on the first side face, and each convex portion is located in a corresponding guide groove.

In some embodiments, a fourth gasket is disposed between the sidewall of the guide groove and the corresponding convex portion, and the fourth gasket extends along the first direction.

In some embodiments, the guide part includes two of the convex portions disposed oppositely in the third direction.

In some embodiments, the shell further includes a second accommodation groove, one end of the second accommodation groove is communicated with the first accommodation groove, the other end of the second accommodation groove is provided with a third limit plate, and a guide hole is formed on the third limit plate; the response part is located in the second accommodation groove, and the response part includes a first portion and a second portion connected to the first portion, and the first portion and the second portion are disposed along the second direction; the first portion is in contact with the second end face of the transmission part, and the first portion is configured to be movable in the second direction in response to movement of the second end face in the first direction; and the second portion is configured to be movable along the second direction to be protruded or retracted from the guide hole.

In some embodiments, the response part further includes an elastic component, and the elastic component is disposed outside the second portion, and the elastic component is located between the first portion and the third limit plate.

In some embodiments, a surface of the first portion in contact with the second end face is a cambered surface.

In some embodiments, the shell includes a first sub-shell and a second sub-shell that are detachable and disposed along the third direction, at least one first connection portion is provided at an outer side of the first sub-shell, a first connection hole is formed on the first connection portion, at least one second connection portion in one-to-one correspondence with the first connection portion is provided at an outer side of the second sub-shell, and a second connection hole is formed on the second connection portion, the transmission adjustment structure further includes at least one connection part corresponding to the at least one first connection hole, the at least one connection part passes through the first connection hole and the second connection hole to fix the first sub-shell to the second sub-shell.

In some embodiments, at least one third connection structure is disposed on the shell, and the at least one third connection structure is configured to be connected and fixed to the casing.

In a second aspect, an embodiment of the present disclosure provides a casing, including a body portion and at least one transmission adjustment structure located on the body portion, wherein the transmission adjustment structure is the transmission adjustment structure described in the first aspect.

In some embodiments, the body portion includes a bottom plate and a sidewall connected to the bottom plate, the sidewall is located at one side of the bottom plate and disposed along an edge of the bottom plate; and a first through hole exposing the adjustment hole is provided at a position on the sidewall corresponding to the adjustment hole.

In a third aspect, an embodiment of the present disclosure provides a tiled display device, including the casing described in the second aspect, and multiple sub-display panel assemblies disposed on the casing.

BRIEF DESCRIPTION OF DRAWINGS

Accompanying drawings are provided to provide a further understanding of the present disclosure and constitute a part of the specification and together with the following detailed description serve to explain the present disclosure but does not constitute limitations on the present disclosure. In the drawings.

Figure 1:
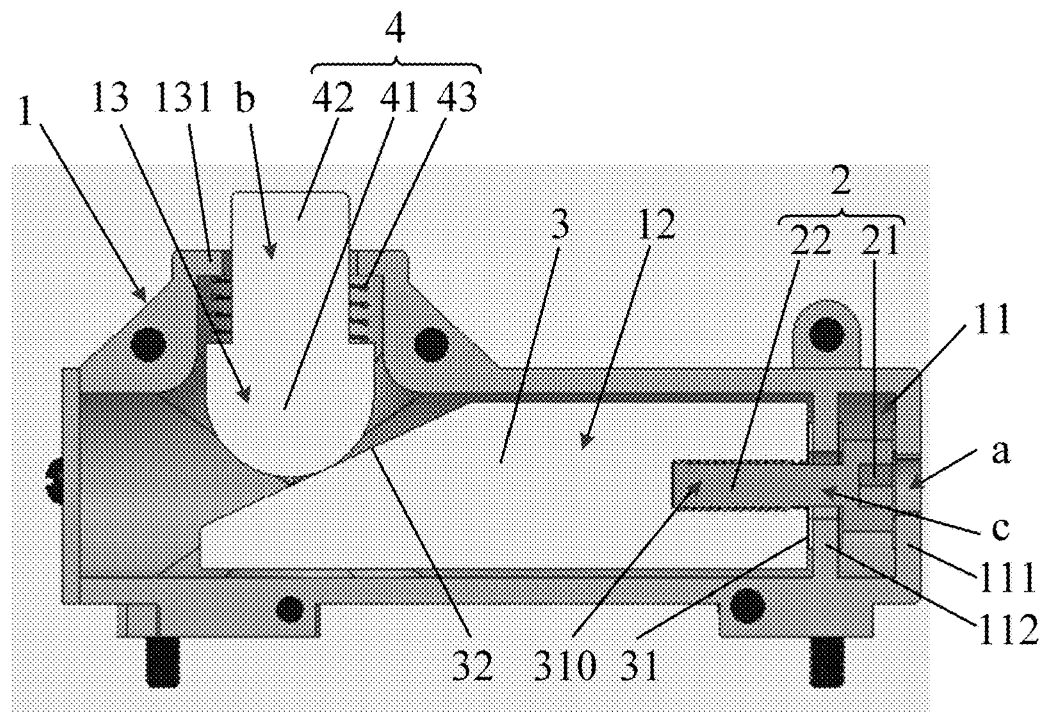
FIG. 1 is a side sectional view of a transmission adjustment structure according to an embodiment of the present disclosure.

DESCRIPTION OF REFERENCE SIGNS IN THE DRAWING shell 1: adjustment hole a, guide hole b;
limit groove 11, first limit plate 111, second limit plate 112, first via hole c;
first accommodation groove 12, guide part 121, convex portion 122;
second accommodation groove 13, third limit plate 131;
first sub-shell 14, second sub-shell 15, third sub-shell 16; first connection portion 141, first connection hole 142, second connection portion 151, second connection hole 152, third connection structure 160;
rotation part 2: adjustment portion 21, connection portion 22, external thread 2*a;*
transmission part 3: first end face 31, second end face 32, first side face 33, adaptation groove 310, guide groove 330, internal thread 3*a;*
response part 4: first portion 41, second portion 42, elastic component 43;
first gasket 51, second gasket 52, third gasket 53, fourth gasket 54;
external tool W, first direction X, second direction Z, third direction Y, virtual plane A;
body portion 6: bottom plate 61, sidewall 62, first through hole d; sub-display panel assembly 7.

DETAILED DESCRIPTION

Specific embodiments of the present disclosure are described in detail below with reference to the accompanying drawings. It should be understood that the specific embodiments described herein are intended only to illustrate and explain the present disclosure and are not intended to limit the present disclosure.

In order to make objectives, technical solutions and advantages of the embodiments of the present disclosure more clear, the technical solutions of the embodiments of the present disclosure will be clearly and completely described below with reference to the drawings of the embodiments of the present disclosure. Apparently, the described embodiments are a part of the embodiments of the present disclosure, not all of the embodiments. Based on the described embodiments of the present disclosure, all other embodiments obtained by those of ordinary skill in the art without inventive effort are within the protection scope of the present disclosure.

Unless otherwise defined, technical terms or scientific terms used in the embodiments of the present disclosure shall have common meanings understood by people with ordinary skills in the field to which the present disclosure pertains. The “first”, “second” and similar terms used in the present disclosure do not indicate any order, quantity, or importance, but are used only for distinguishing different components. Likewise, “include”, “contain”, or a similar term means that an element or an object appearing before the term covers an element or an object listed after the term and its equivalent, but does not exclude other elements or objects. “Connect”, “join”, or a similar term is not limited to a physical or mechanical connection, but may include an electrical connection, whether direct or indirect. “Upper”, “lower”, “left”, “right”, etc., are used to represent relative position relations, and when an absolute position of a described object is changed, the relative position relation may also be correspondingly changed.

With the rapid development of display technology, tiled display devices have been more and more widely used in large-scale places such as shopping malls, cinemas, stadiums, or the like. It not only solves technical problems of a high cost and difficult maintenance of a single large screen, but also has very high scalability, which can be suitable for displaying images of various sizes.

The above tiled display device includes multiple sub-display panel assemblies and casings. A sub-display panel assembly includes multiple display panels and bracket structures configured to bear the display panels. Since in an assembly process, segment differences will exist between adjacent casings and adjacent bracket structures located on a same casing, while fixing the segment differences requires re-installation of the sub-display panel assemblies or the casing, thus an assembly efficiency of the tiled display device is affected. Moreover, due to a poor assembly of the casings or the bracket structures, it will cause that a gap will appear between adjacent display panels, which affects evenness of the whole tiled display device, and then causes an adverse effect on a display effect.

In order to solve at least one of the above technical problems, an embodiment of the present disclosure provides a transmission adjustment structure, configured to adjust segment differences between multiple casings in the tiled display device and multiple bracket structures on a same casing, so as to ensure evenness of display faces of the multiple display panels in the tiled display device, thereby improving the display effect and a splicing assembly yield.

Figure 2A:
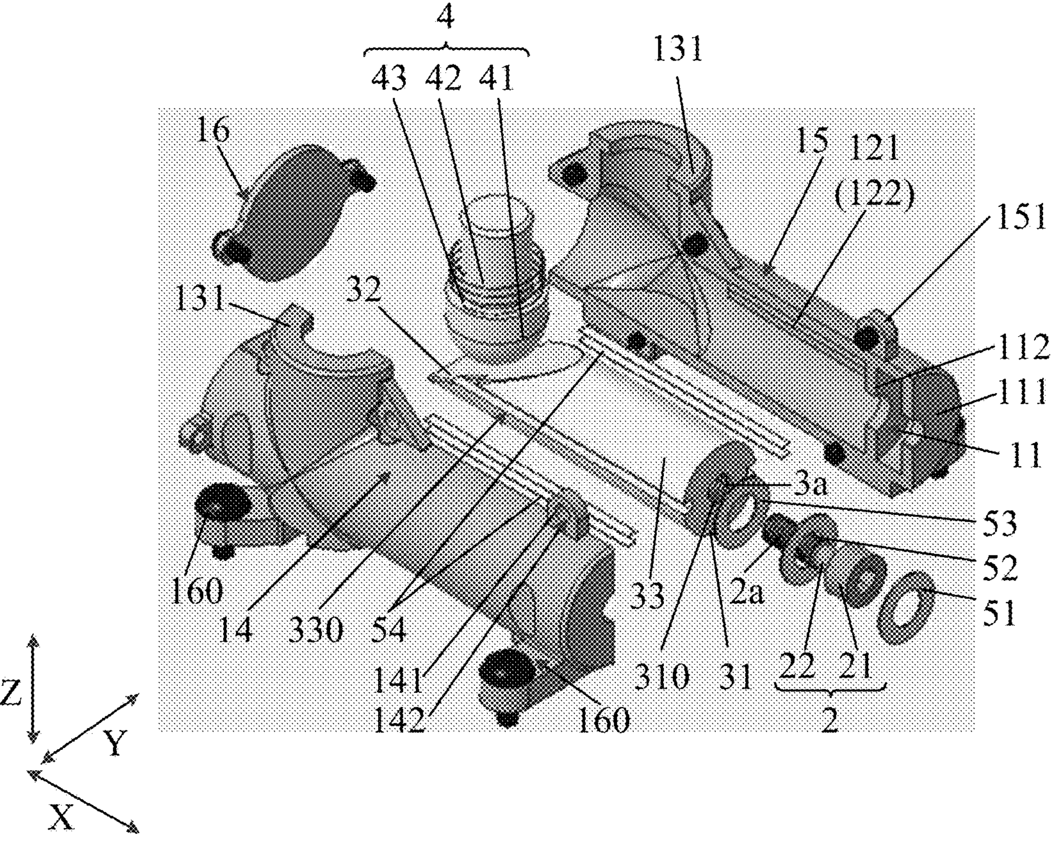
FIGS. 2*a* and 2*b* are exploded diagrams of a transmission adjustment structure according to an embodiment of the present disclosure.
Figure 2B:
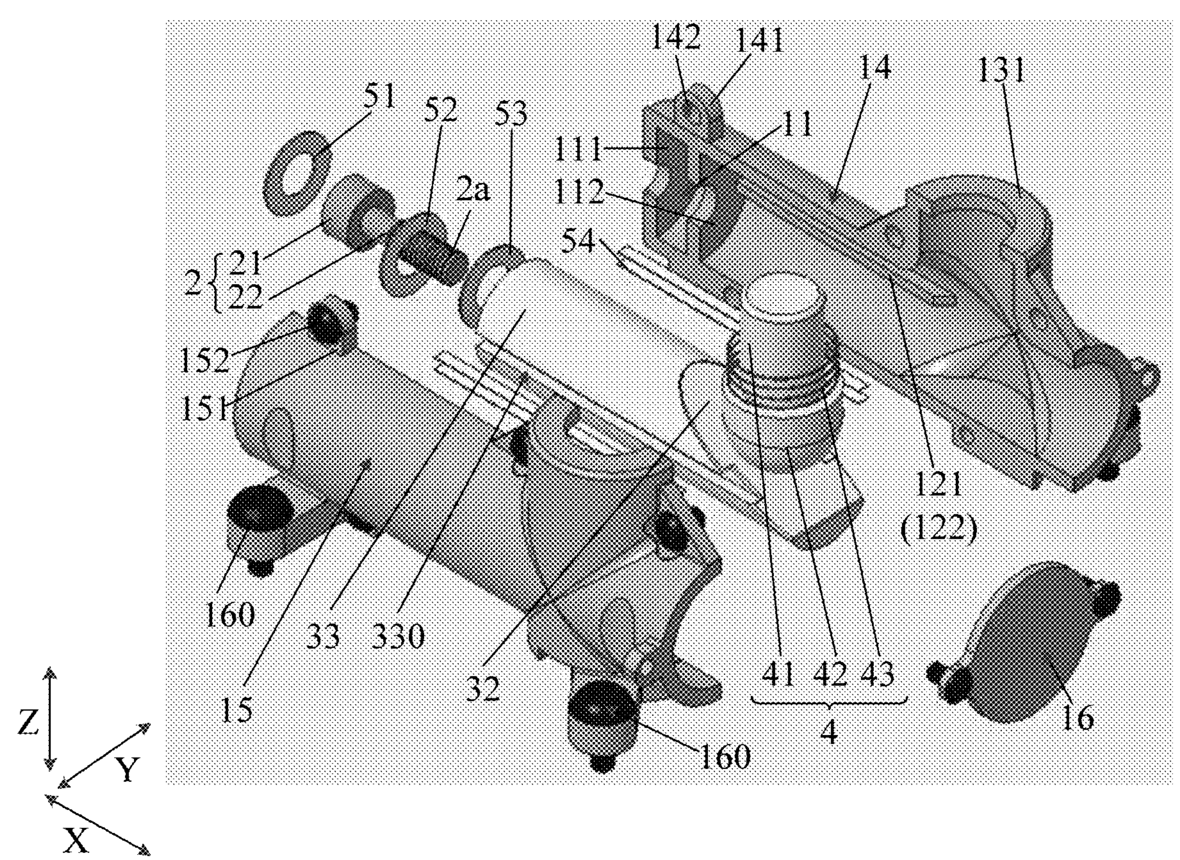
Figure 3:
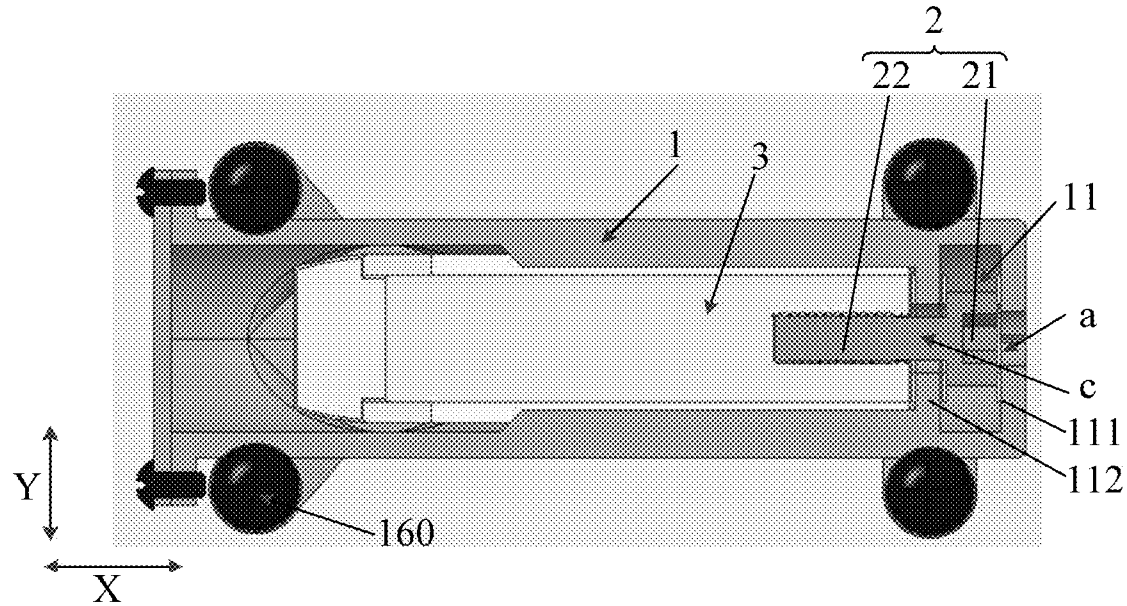
FIG. 3 is a top sectional view of a transmission adjustment structure according to an embodiment of the present disclosure.

FIG. 1 is a side sectional view of a transmission adjustment structure according to an embodiment of the present disclosure. FIGS. 2*a* and 2*b* are exploded diagrams of a transmission adjustment structure according to an embodiment of the present disclosure. FIG. 3 is a top sectional view of a transmission adjustment structure according to an embodiment of the present disclosure. In order to clearly show a structure of a transmission part in FIG. 3 above, a response part is made transparent.

As shown in FIGS. 1 to 3, the transmission adjustment structure includes: a shell 1, a rotation part 2, a transmission part 3, and a response part 4. Among them, at a position on the shell 1 corresponding to the rotation part 2, an adjustment hole a which exposes one end of the rotation part 2 is provided, and the other end of the rotation part 2 is connected to the transmission part 3. At a position on the shell 1 corresponding to the response part 4, a guide hole b exposing one end of the response part 4 is provided, and the other end of the response part 4 is in contact with the transmission part 3.

The rotation part 2 is configured to rotate in response to controlling by an external tool W on the end of the rotation part 2 exposed by the adjustment hole a. The transmission part 3 is configured to move along a first direction X in response to rotation controlling by the rotation part 2, and the first direction X is an extension direction of the transmission part 3. The response part 4 is configured to move along a second direction Z in response to movement of the transmission part 3, and the second direction Z intersects the first direction X to adjust an amount of protrusion of the response part 4 in the guide hole b.

The transmission adjustment structure according to the embodiment of the present disclosure is applied to a casing of the tiled display device. Firstly, the external tool W may directly rotate and adjust the rotation part 2 through the adjustment hole a, which may improve an adjustment efficiency and convenience of the tiled display device in the assembly process. Secondly, rotation of the transmission part 3 may drive the guide part 121 to move, so as to adjust an amount of protrusion of the guide part 121 in the guide hole b, and then a position of a sub-display panel assembly supported by the casing may be adjusted, which ensures that display faces of various display panels are on a same plane after assembly is completed in the tiled display device, improving a display effect and a splicing assembly yield.

It should be understood that the external tool W described above is an adjustment tool adapted to the end of the rotation part 2 exposed by the adjustment hole a, which is not limited in the embodiment of the present disclosure. In addition, the second direction Z is an extending direction of the response part 4, and when the transmission adjustment structure is disposed on the casing, the second direction Z is also a thickness direction of the casing.

In some embodiments, as shown in FIGS. 1 to 3, the shell 1 includes a limit groove 11. The limit groove 11 includes a first limit plate 111 and a second limit plate 112 disposed oppositely, and a sidewall located between the first limit plate 111 and the second limit plate 112. The rotation part 2 includes an adjustment portion 21 and a connection portion 22 connected to the adjustment portion 21, and the adjustment portion 21 is located in the limit groove 11. The adjustment hole a is located on the first limit plate 111 of the limit groove 11 to expose at least a portion of the adjustment portion 21. A first via hole c is provided on the second limit plate 112 of the limit groove 11, and the connection portion 22 extends along the first direction X through the first via hole c.

Optionally, the adjustment portion 21 and the connection portion 22 are in an integral structure, and the connection portion 22 is configured to move coaxially with the adjustment portion 21 in response to rotation controlling by the external tool W on the adjustment portion 21. In an example, the adjustment portion 21 may be a nut, the connection portion 22 may be a screw connected to the nut, and the adjustment portion 21 and the connection portion 22 constitute the rotation part 2, such as a fine tooth screw.

In some embodiments, as shown in FIGS. 1 to 3, one end of the adjustment portion 21 close to the first limit plate 111 has an annular-shaped cross-section parallel to the first limit plate 111, and the annular shape has an inner contour and an outer contour. An orthographic projection of the inner contour on a plane where the first limit plate 111 is located is located in a region where the adjustment hole a is located, that is, the adjustment hole a completely exposes the inner contour of the adjustment portion 21, so that the external tool W rotates and adjusts the adjustment portion 21. At the same time, an orthographic projection of the outer contour on the plane where the first limit plate 111 is located covers the adjustment hole a, that is, the first limit plate 111 can completely shield the outer contour of the adjustment portion 21, and when the external tool W adjusts the adjustment portion 21, engaged and limited by the first limit plate 111 and the second limit plate 112, the adjustment portion 21 only performs a rotational movement, and does not perform an axial (first direction X) movement.

Optionally, an inner contour of one end of the adjustment portion 21 close to the first limit plate 111 may be a polygonal shape, such as a pentagon, a hexagon, or the like. When the inner contour of one end of the adjustment portion 21 is the hexagon, the external tool W may be a hexagonal wrench with a model adapted to inner contour of the one end of the adjustment portion. Since the hexagonal wrench is a universal assembly tool, it is convenient to assemble and adjust the transmission adjustment structure, improving applicability of the transmission adjustment structure, which may be adjusted quickly and conveniently in both indoor and outdoor environments.

In some embodiments, as shown in FIGS. 1 to 3, a first gasket 51 is disposed between the adjustment portion 21 and the first limit plate 111, and/or a second gasket 52 is disposed between the connection portion 22 and the second limit plate 112. Since both the limit groove 11 and the rotation part 2 are made of metal materials, disposing a gasket can reduce a friction force between metal members, which facilitates the adjustment, and can reduce wear and tear between the rotation part 2 and the limit groove 11 in an assembly and adjustment process.

Optionally, as shown in FIGS. 2*a* and 2*b*, the first gasket 51 may have an annular shape, such as a circular ring shape, or another shape, so long as the inner contour of the one end of the adjustment portion 21 close to the first limit plate 111 is exposed, and adjustment by the external tool W on the adjustment portion 21 is not affected. The second gasket 52 may also have an annular shape. When the second gasket 52 has the annular shape, the second gasket 52 may be sleeved outside the connection portion 22, at which time the second gasket 52 may be in a circular ring shape, and inner and outer contours of the second gasket 52 with ring shapes may also be in a polygonal shape. Specific shapes of the first gasket 51 and the second gasket 52 are not limited in the embodiments of the present disclosure.

In some embodiments, as shown in FIGS. 1 to 3, the shell 1 further includes a first accommodation groove 12, the accommodation groove 12 is communicated with the limit groove 11 through the first via hole c, and the transmission part 3 is located in the first accommodation groove 12. The transmission part 3 includes a first end face 31 close to the first via hole c, a second end face 32 away from the first via hole c, and a first side face 33 located between the first end face 31 and the second end face 32. An adaptation groove 310 is formed on the first end face 31, an external thread 2*a* is provided on the connection portion 22, and an internal thread 3*a* adapted to the external thread 2*a* of the connection portion 22 is provided in the adaptation groove 310. A guide part 121 is disposed in the first accommodation groove 12, and a guide groove 330 adapted to the guide part 121 is disposed on the first side face 33 for the transmission part 3 to move along the guide part 121, and the guide part 121 extends along the first direction X.

Figure 4A:
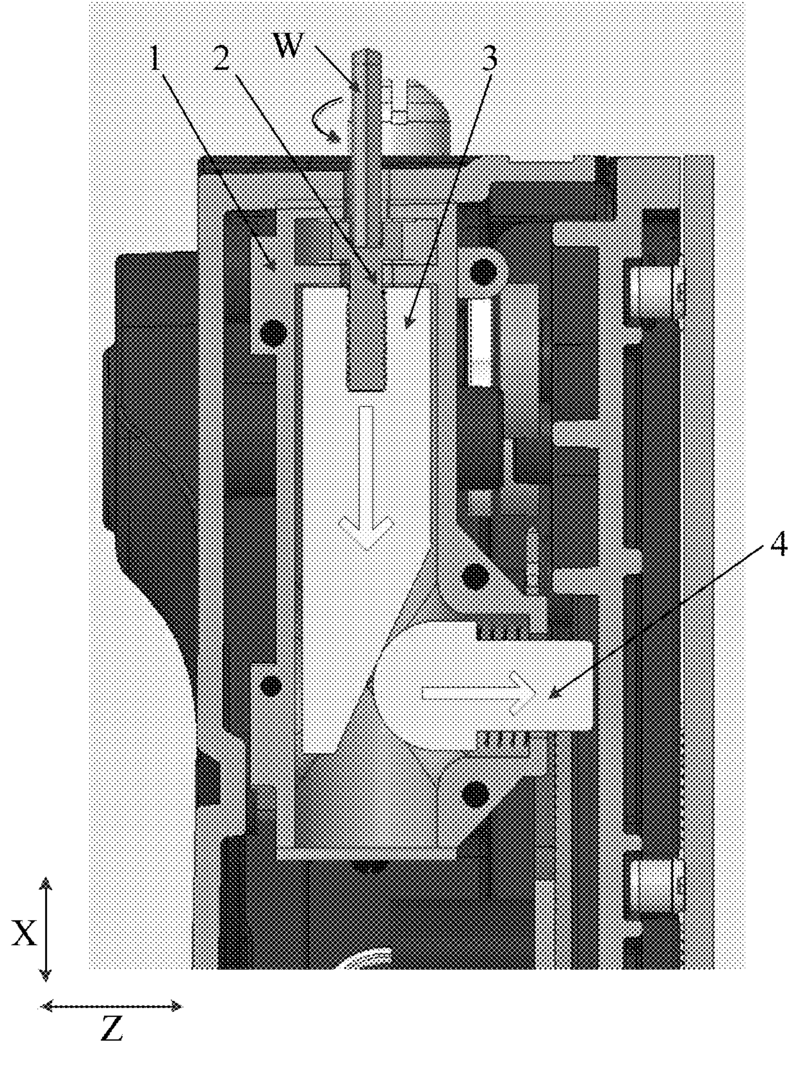
FIGS. 4*a* and 4*b* are schematic diagrams of a process for adjusting a transmission adjustment structure according to an embodiment of the present disclosure.
Figure 4B:
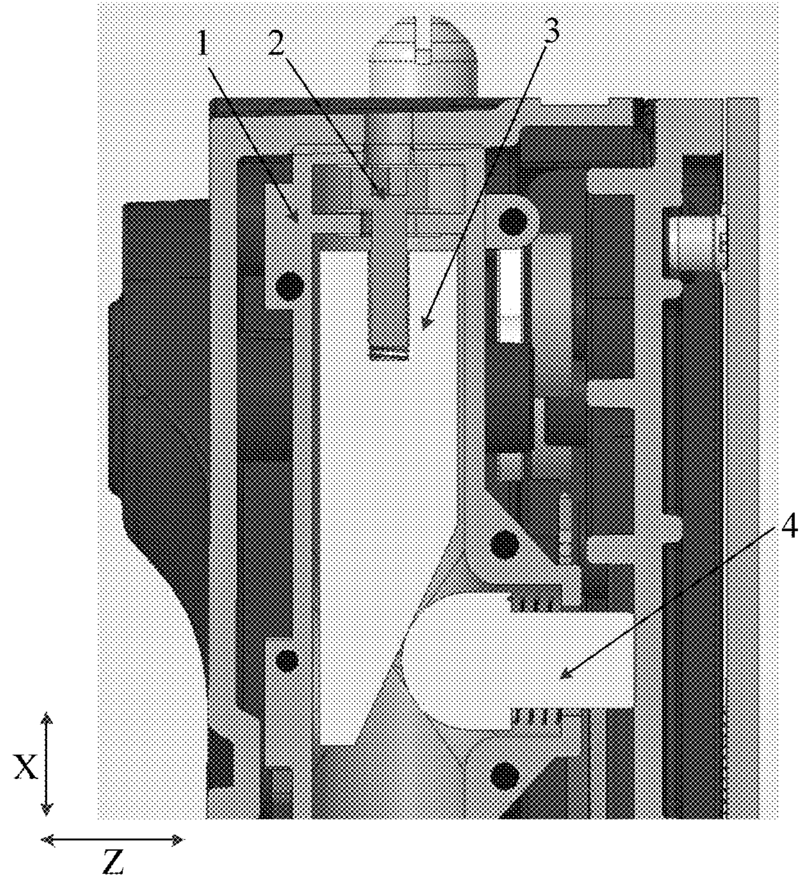

FIGS. 4*a* and 4*b* are schematic diagrams of a process for adjusting a transmission adjustment structure according to an embodiment of the present disclosure. As shown in FIGS. 4*a* and 4*b*, in an assembly/adjustment process, the external tool W rotates one end of the adjustment portion 21 to rotate the connection portion 22 connected to the adjustment portion 21, and the connection portion 22 drives the transmission part 3 to move.

In some embodiments, as shown in FIGS. 2*a* and 2*b*, the guide part 121 includes at least one convex portion 122 disposed on a sidewall of the first accommodation groove 12, and the convex portion 122 extends along the first direction X. A guide groove 330 in one-to-one correspondence with a convex portion 122 is provided on the first side face 33, and the convex portion 122 is located in the corresponding guide groove 330. Since the guide part 121, i.e. the convex portion 122 extending along the first direction X, is disposed in the first accommodation groove 12, and the guide groove 330 is provided on the first side face 33 of the transmission part 3, the guide part 121 and the guide groove 330 are adapted to each other, and an acting force in the second direction Z is generated on the transmission part 3 under a joint action of the guide part 121 and the guide groove 330, so that the transmission part 3 can only move in the first direction X and cannot rotate.

In addition, based on movement of the transmission part 3 in an extending direction of the guide part 121, that is, the first direction X, a change of a distance between the first end face 31 of the guide part 121 and the second limit plate 112 of the limit groove 11 occurs, and there is a certain gap between one end of the connection portion 22 away from the adjustment portion 21 and the bottom of the adaptation groove 310 on the first end face 31.

In an example, as shown in FIGS. 2*a* and 2*b*, the guide part 121 includes two convex portions 122, and the two convex portions 122 are disposed oppositely in a third direction Y, then two guide grooves 330 configured to place the convex portions 122 are provided at corresponding positions on the first side face 33 of the transmission part 3. The above third direction Y is perpendicular to the first direction X and perpendicular to the second direction Z.

As shown in FIGS. 4*a* and 4*b*, the second end face 32 of the transmission part 3 faces the response part 4 and is in contact with the response part 4, and the second end face 32 is configured to push the response part 4 to move along the second direction Z when the transmission part 3 moves along the first direction X, so as to adjust an amount of protrusion of the response part 4 in the guide hole b.

In some embodiments, an included angle between the second end face 32 and a virtual plane A is between 25° and 75°, and the virtual plane A is perpendicular to the second direction Z. That is, the second end face 32 is an inclined face having a certain inclination angle, and when the second end face 32 moves in the first direction X, the response part 4 in contact with the second end face 32 may be pushed to move in the second direction Z.

It should be understood that the included angle between the second end face 32 and the virtual plane A may be 30°, 40°, 50°, 60°, 70°, or the like, as long as it can be ensured that the response part 4 is made to move in the second direction Z when the second end face 32 moves along the first direction X, which is not limited in embodiments of the present disclosure.

Based on a same inventive concept as the first gasket 51/second gasket 52, as shown in FIGS. 2*a* and 2*b*, a third gasket 53 is disposed between the first end face 31 and the second limit plate 112. A fourth gasket 54 is disposed between a sidewall of the guide groove 330 and a corresponding convex portion 122, and the fourth gasket 54 extends along the first direction X to reduce a friction force between the shell 1 and the transmission part 3 in an adjustment process, which facilitates the adjustment.

It should be noted that, in the adjustment process, a change of the distance between the first end face 31 of the transmission part 3 and the second limit plate 112 of the limit groove 11 will occur, so that the third gasket 53 needs to be sleeved outside the connection portion 22 to avoid that the third gasket 53 falls off. At this time, the third gasket 53 has an annular shape structure, and shapes of an inner ring and an outer ring of the third gasket 53 may both be circles or other polygonal shapes. In addition, the fourth gasket 54 may include two portions respectively located between two sidewalls of the guide groove 330 in the second direction Z and the convex portion 122, and each portion may penetrate an entire sidewall of the guide groove 330 in the first direction X, or may be disposed at intervals, which is not limited in the embodiments of the present disclosure.

In some embodiments, as shown in FIGS. 1 to 4*b*, the shell 1 further includes a second accommodation groove 13, one end of the second accommodation groove 13 is communicated with the first accommodation groove 12, the other end of the second accommodation groove 13 is provided with a third limit plate 131, and the guide hole b is formed on the third limit plate 131.

The response part 4 is located in the second accommodation groove 13, and the response part 4 includes a first portion 41 and a second portion 42 connected to the first portion 41. The first portion 41 and the second portion 42 are disposed along the second direction Z, the first portion 41 is in contact with the second end face 32 of the transmission part 3, and the first portion 41 is configured to move in the second direction Z in response to movement of the second end face 32 in the first direction X. The second portion 42 is configured to be movable along the second direction Z to be protruded or retracted from the guide hole b. It should be understood that the first portion 41 and the second portion 42 of the response part 4 are connected in an integral structure.

As shown in FIGS. 4*a* and 4*b*, in the assembly/adjustment process, the external tool W rotates one end of the adjustment portion 21, so that the connection portion 22 connected to the adjustment portion 21 is rotated, and the connection portion 22 drives the transmission part 3 to move in the first direction X, then the second end face 32 of the transmission part 3 also moves in the first direction X. Since the second end face 32 is an inclined face with a certain inclination angle, and the first portion 41 of the response part 4 is in contact with the second end face 32 of the transmission part 3, the movement of the second end face 32 in the first direction X may push the response part 4 to move in the second direction Z.

In some embodiments, as shown in FIGS. 1 to 2*b* and FIGS. 4*a* and 4*b*, the response part 4 further includes an elastic component 43, and the elastic component 43 is disposed outside the second portion 42 and located between the first portion 41 and the third limit plate 131. In an example, the elastic component 43 may be a preloading spring, and when an amount of protrusion of the response part 4 on the guide hole b is changed, the elastic component 43 provides a preloading elastic force to ensure that the response part 4 is always in a stable state.

It should be noted that the above stable state means that the response part 4 can be smoothly protruded or retracted based on an action of the preloading spring. When an amount of protrusion or retraction of the response part 4 in the guide hole b is changed, an amount of protrusion or retraction of the preloading spring is also changed, and the changes of amounts of protrusion or retraction of the preloading spring and the response part 4 are opposite, so that the response part 4 can be smoothly protruded or retracted.

In some embodiments, as shown in FIGS. 1 to 2*b* and FIGS. 4*a* and 4*b*, a surface at which the first portion 41 is in contact with the second end face 32 is an arcuate surface. It should be understood that one end of the first portion 41 in contact with the second end face 32 may be in another structure, such as a polygonal cylinder, a cylinder, or the like, which is not limited in embodiments of the present disclosure. However, it should be noted that, as shown in the figure FIGS. 1 to 2*b*, the first portion 41 of the response part 4 abuts against the second end face 32 of the guide part 121, and there is no mechanical connection between the first portion 41 and the second end face 32, then the surface at which the first portion 41 is in contact with the second end face 32 should be as smooth as possible to reduce a friction force between metal members.

In some embodiments, as shown in FIGS. 2*a* and 2*b*, the shell 1 includes a first sub-shell 14 and a second sub-shell 15 that are detachable and disposed along the third direction Y, an outer side of the first sub-shell 14 is provided with at least one first connection portion 141, a first connection hole 142 is provided on the first connection portion 141, an outer side of the second sub-shell 15 is provided with a second connection portion 151 in one-to-one correspondence with the first connection portion 141, and a second connection hole 152 is provided on the second connection portion 151. The transmission adjustment structure further includes at least one connection part corresponding to the first connection hole 142, the connection part passes through the first connection hole 142 and the second connection hole 152 to fix the first sub-shell 14 to the second sub-shell 15. In an example, the connection part may be a screw adapted to the first connection hole 142/second connection hole 152.

In some embodiments, as shown in FIGS. 2*a* and 2*b*, the shell 1 may further include a third sub-shell 16, the third sub-shell 16 is located between the first sub-shell 14 and the second sub-shell 15 and is fixed by a connection part. The above third sub-shell 16 may be a rear cover of the entire shell.

Figure 5A:
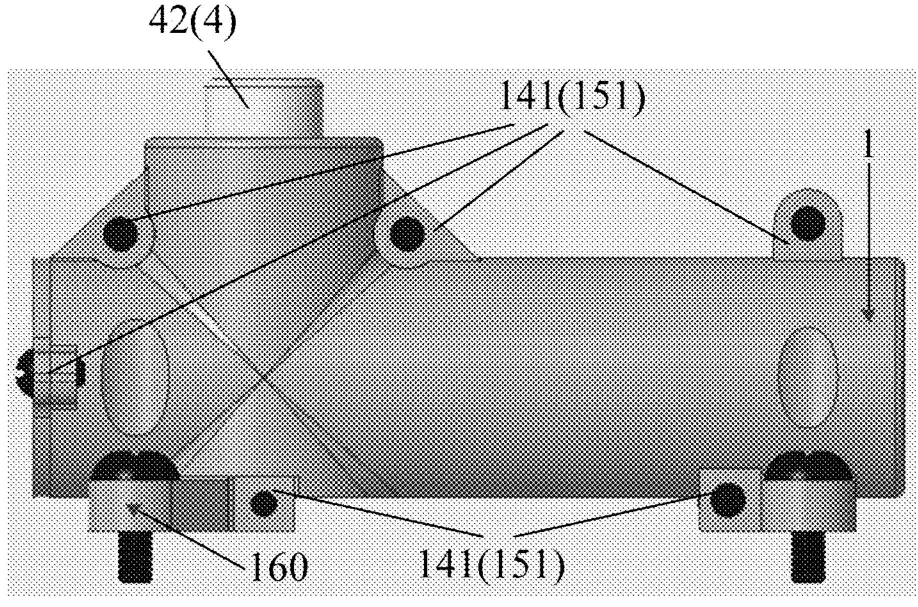
FIGS. 5*a*, 5*b*, and 5*c* are respectively front view, top view, and side view of a transmission adjustment structure according to an embodiment of the present disclosure.
Figure 5B:
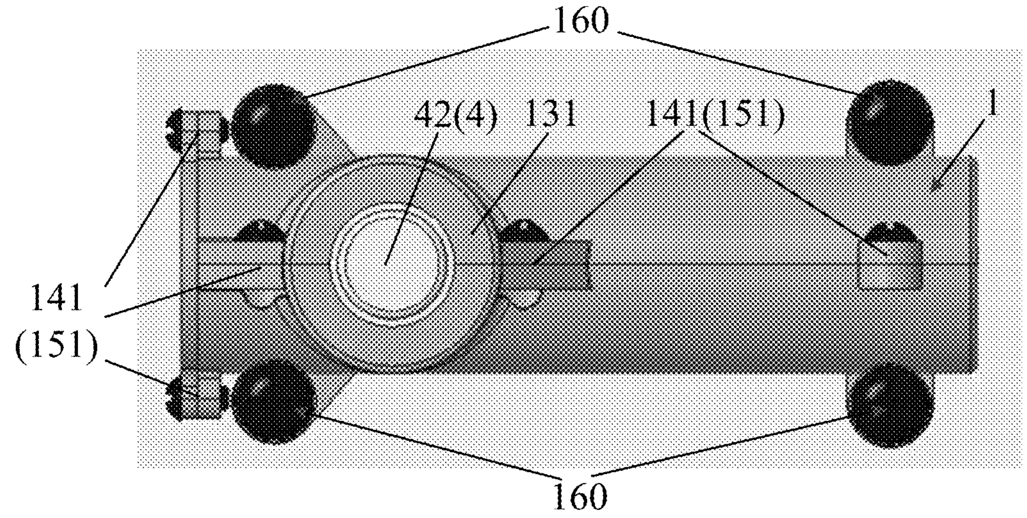
Figure 5C:
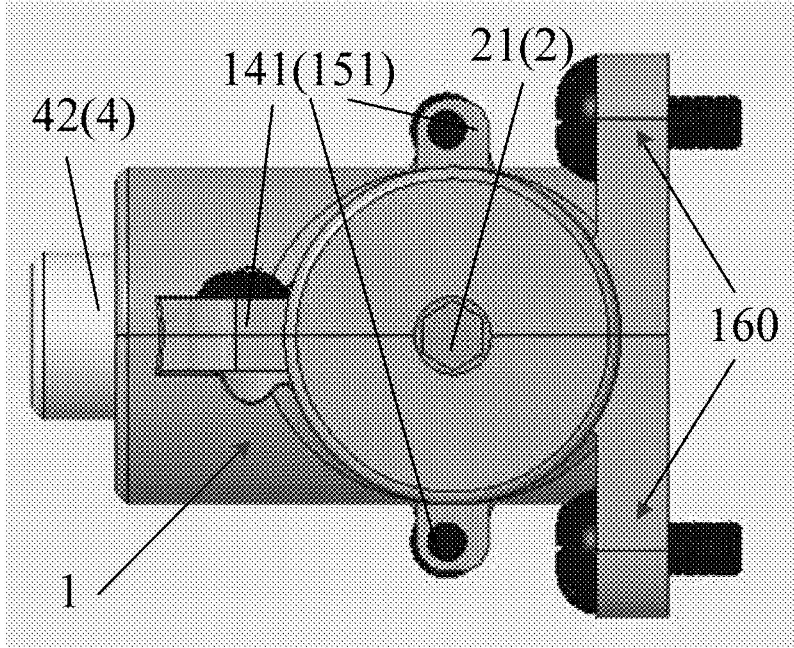
Figure 6A:
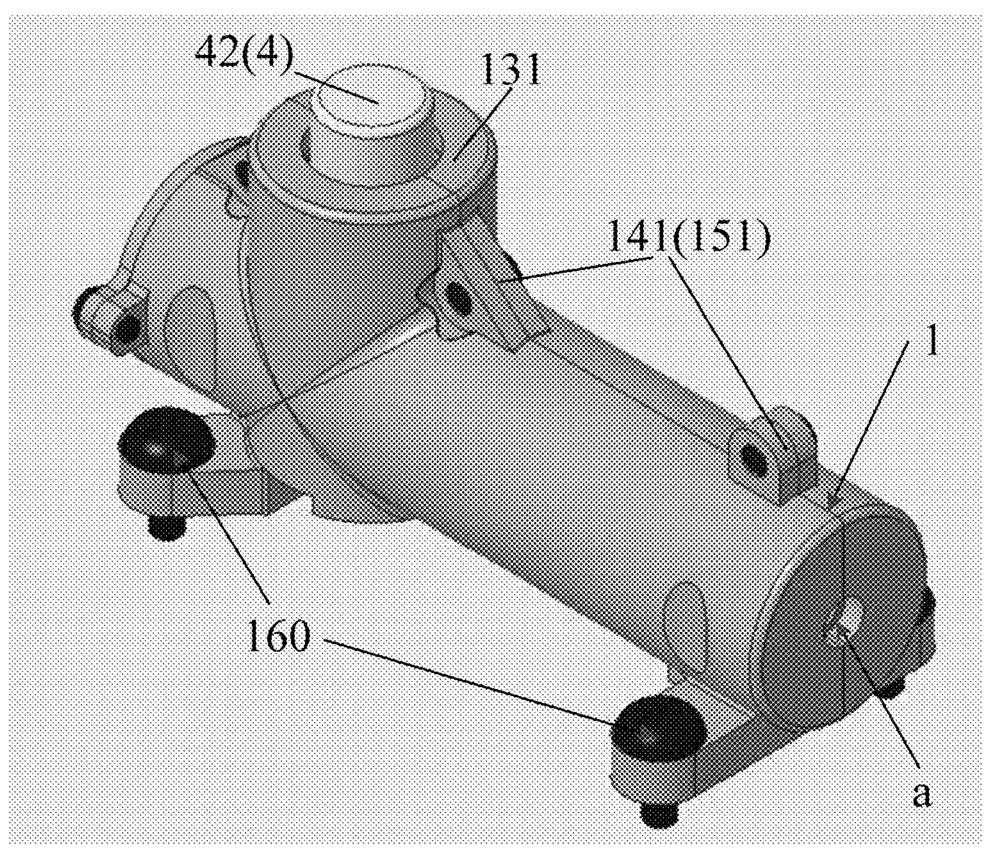
FIGS. 6*a*, 6*b*, and 6*c* are three-dimensional structural views of a transmission adjustment structure according to an embodiment of the present disclosure.
Figure 6B:
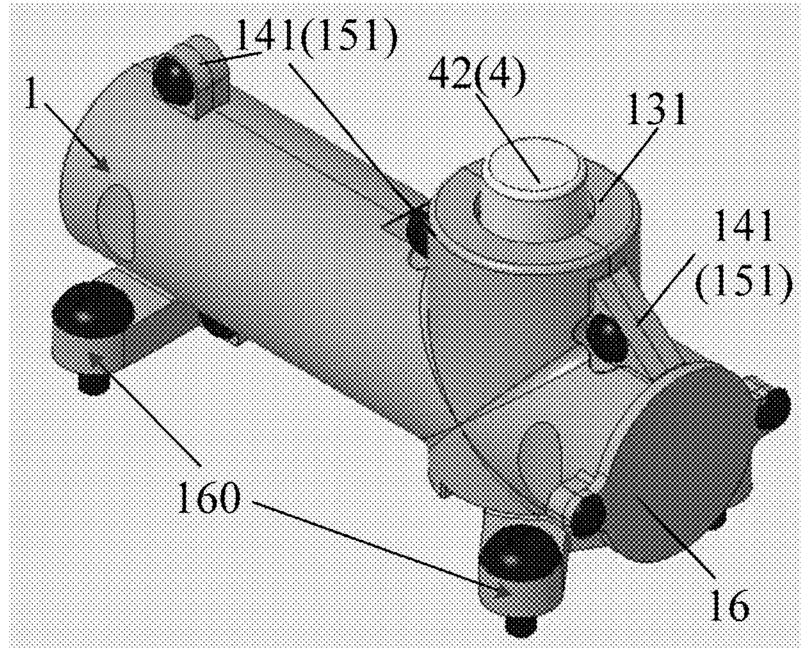
Figure 6C:
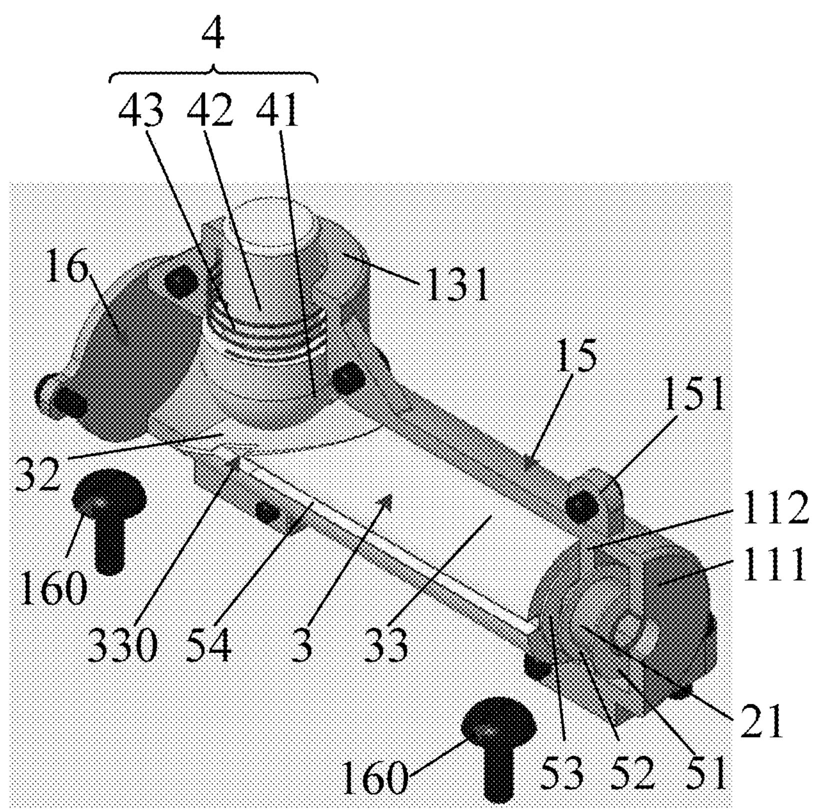

FIGS. 5*a*, 5*b*, and 5*c* are front, top, and side views of a transmission adjustment structure according to an embodiment of the present disclosure respectively. FIGS. 6*a*, 6*b*, and 6*c* are three-dimensional structural views of a transmission adjustment structure according to an embodiment of the present disclosure, wherein in FIG. 6*c*, the first sub-shell 14 is made transparent in order to clearly show structures of various components located inside the shell 1 in the transmission adjustment structure.

In some embodiments, as shown in FIGS. 5*a* to 6*c*, at least one third connection structure 160 is disposed on the shell 1, and the at least one third connection structure 160 is configured to be connected and fixed to the casing.

Based on the same inventive concept described above, an embodiment of the present disclosure further provides a casing, and the casing includes a body portion 6 and at least one transmission adjustment structure located on the body portion 6. The transmission adjustment structure is the transmission adjustment structure in any of the above embodiments.

Figure 7:
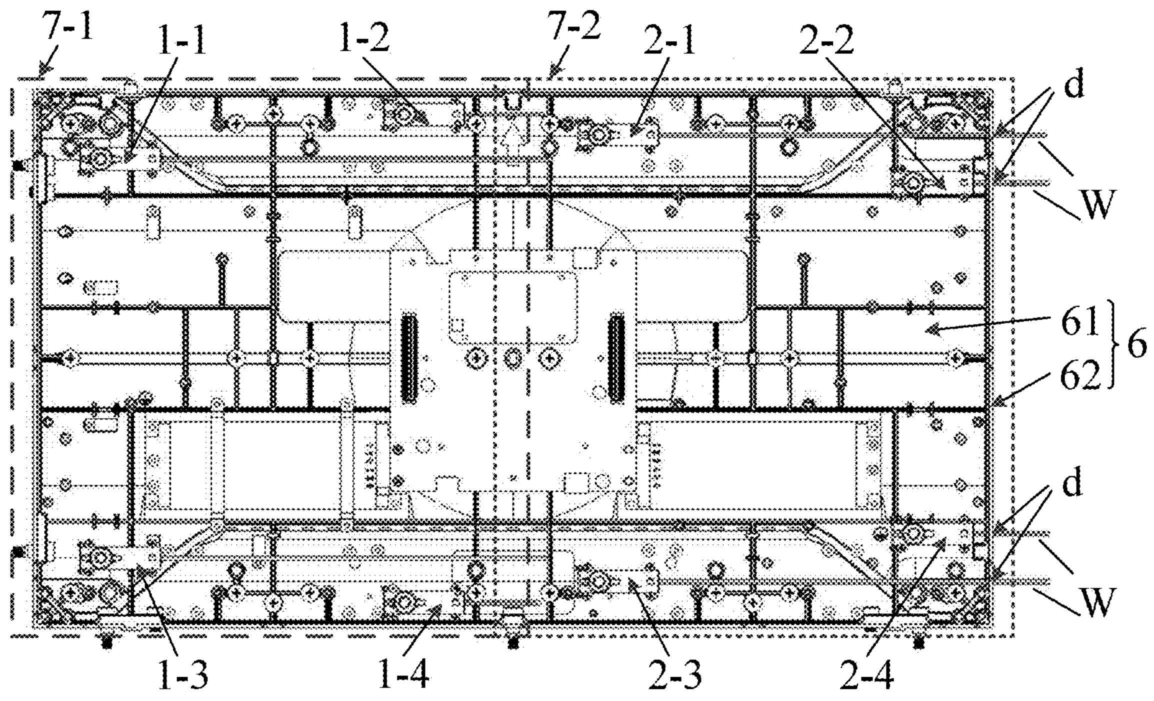
FIG. 7 is a schematic structural diagram of a casing according to an embodiment of the present disclosure.

FIG. 7 is a schematic structural diagram of a casing according to an embodiment of the present disclosure. As shown in FIG. 7, the body portion 6 of the casing includes a bottom plate 61 and a sidewall 62 connected to the bottom plate 61. The sidewall 62 is located at one side of the bottom plate 61 and disposed along an edge of the bottom plate 61, and a first through hole d exposing the adjustment hole is provided at a position on the sidewall 62 corresponding to an adjustment hole.

In some embodiments, a fourth connection structure is disposed on the bottom plate 61, the fourth connection structure is configured to be assembled with the third connection structure on the transmission adjustment structure to fix the transmission adjustment structure. In an example, the third connection structure on the shell may include a third connection hole of a third connection part located on the third connection part. In this case, a fourth connection hole is provided on the fourth connection structure, penetrating the third connection hole and the fourth connection hole through the connection part to fix the transmission adjustment structure on the bottom plate 61 of the casing. In another example, the third connection structure on the shell and the fourth connection structure on the casing may be magnetically attractive members, and are connected based on an adsorptive force; or, the third connection structure on the shell and the fourth connection structure on the casing may be engagement members that are mutually adapted, and are engaged and connected, which is not limited in the embodiments of the present disclosure.

In an example, as shown in FIG. 7, eight transmission adjustment structures are disposed on the bottom plate 61 on the casing, and the casing supports two sub-display panel assemblies 7, then transmission adjustment structures 1-1 to 1-4 may be distributed at four corners of one of the sub-display panel assemblies 7-1, and configured to adjust distances between the respective corners of the sub-display panel assembly and the bottom plate 61 of the casing. Similarly, the transmission adjustment structures 2-1 to 2-4 may be distributed at four corners of the other sub-display panel assembly 7-2.

In addition, based on a difference in a distance between each transmission adjustment structure and the first through hole d on the sidewall 62 of the casing, the transmission adjustment structure is adjusted correspondingly using an external tool W having adjustment arms of different lengths. For example, the transmission adjustment structure 2-1 may be adjusted using an external tool W with a relatively long adjustment arm, and the transmission adjustment structure 2-2 may be adjusted using an external tool W with a relatively short adjustment arm.

Based on the same inventive concept, an embodiment of the present disclosure further provides a tiled display device, including: a casing described in any of the above embodiments, and multiple sub-display panel assemblies disposed on the casing.

Figure 8:
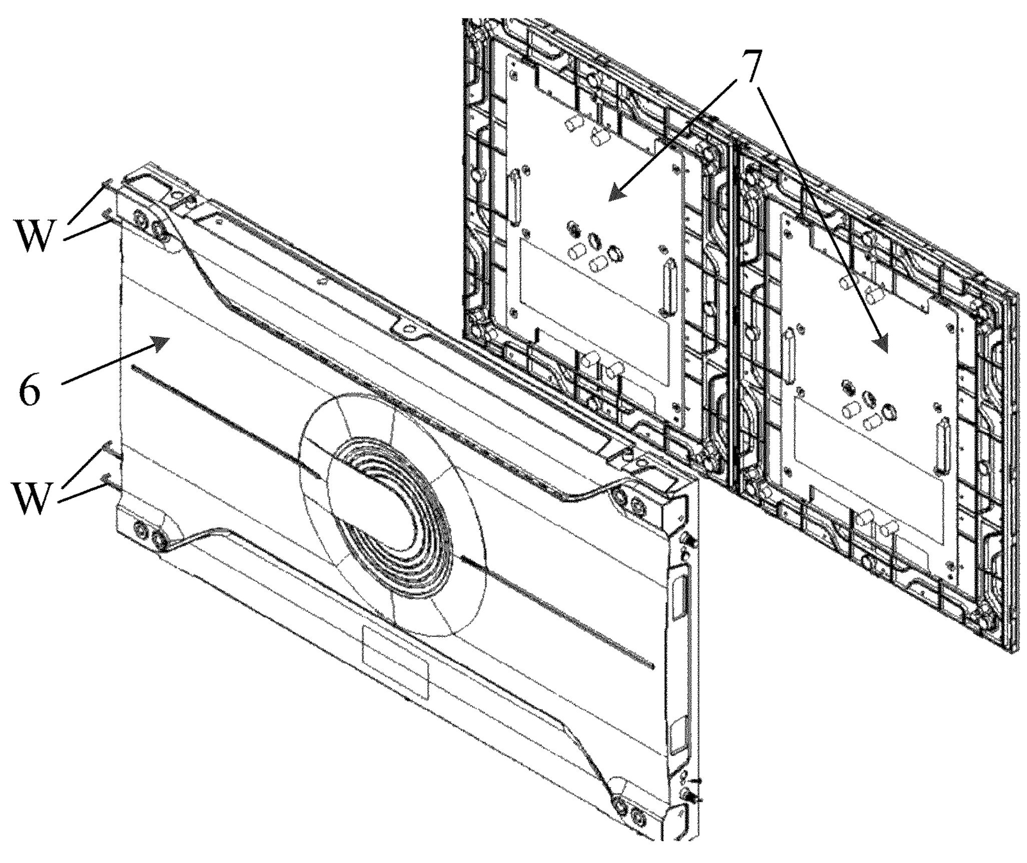
FIG. 8 is a schematic structural diagram of a tiled display device according to an embodiment of the present disclosure.

FIG. 8 is a schematic structural diagram of a tiled display device according to an embodiment of the present disclosure. As shown in FIG. 8, the tiled display device includes a casing and two sub-display panel assemblies 7 supported on the casing, wherein a sub-display panel assembly 7 includes a bracket structure and multiple display panels located on the bracket structure.

For the tiled display device according to the embodiment of the present disclosure, an external tool may be used to rotate and adjust the rotation part of the transmission adjustment structure directly through the first through hole, and the rotating movement of the rotation part drives the transmission part to move in the first direction, so that the response part moves in the second direction to be protruded or retracted in the guide hole. Further, heights of the sub-display panel assemblies carried on the casing in the second direction are affected, so that display faces of multiple display panels on the tiled display device are on a same plane by adjusting multiple transmission adjustment structures, so as to improve a display effect. In addition, since the above first through hole is located on the sidewall of the casing, even if adjustment is performed after an assembly of the tiled display device is completed, disassembly and reassembly are not needed, which saves adjustment time of evenness of the tiled display device, and improves a splicing yield of the tiled display device.

It is to be understood that the above embodiments are only exemplary embodiments employed for the purpose of illustrating the principles of the present disclosure, however the present disclosure is not limited thereto. To those of ordinary skills in the art, various modifications and improvements may be made without departing from the spirit and essence of the present disclosure, and these modifications and improvements are also considered to be within the scope of the present disclosure.

The invention claimed is:

1. A transmission adjustment structure, comprising: a shell, a rotation part, a transmission part, and a response part, wherein an adjustment hole exposing one end of the rotation part is provided at a position on the shell corresponding to the rotation part, and the other end of the rotation part is connected to the transmission part; a guide hole exposing one end of the response part is provided at a position on the shell corresponding to the response part, and the other end of the response part is in contact with the transmission part;

the rotation part is configured to rotate in response to controlling by an external tool on the end of the rotation part exposed by the adjustment hole;

the transmission part is configured to move along a first direction in response to rotation controlling of the rotation part, and the first direction is an extension direction of the transmission part; and the response part is configured to move along a second direction in response to movement of the transmission part, the second direction intersects the first direction to adjust an amount of protrusion of the response part in the guide hole.

2. The transmission adjustment structure of claim 1, wherein the shell comprises a limit groove, the limit groove comprising a first limit plate and a second limit plate that are disposed oppositely, and a sidewall located between the first limit plate and the second limit plate, the rotation part comprises an adjustment portion and a connection portion connected to the adjustment portion, the adjustment portion is located in the limit groove;

the adjustment hole is located on the first limit plate of the limit groove to expose at least portion of the adjustment portion; and a first via hole is formed on the second limit plate of the limit groove, and the connection portion extends along the first direction through the first via hole.

3. The transmission adjustment structure of claim 2, wherein a cross-section of one end of the adjustment portion close to the first limit plate parallel to the first limit plate is in an annular shape, and the annular shape has an inner contour and an outer contour;

an orthographic projection of the inner contour on a plane on which the first limit plate is located is located in a region in which the adjustment hole is located; and an orthographic projection of the outer contour on the plane on which the first limit plate is located covers the adjustment hole.

4. The transmission adjustment structure of claim 2, wherein a first gasket is disposed between the adjustment portion and the first limit plate, and/or, a second gasket is disposed between the connection portion and the second limit plate.

5. The transmission adjustment structure of claim 2, wherein the shell further comprises a first accommodation groove, the first accommodation groove is communicated with the limit groove through the first via hole, the transmission part is located in the first accommodation groove, and the transmission part comprises a first end face close to the first via hole, a second end face away from the first via hole, and a first side face located between the first end face and the second end face;

an adaptation groove is formed on the first end face, an external thread is provided on the connection portion, and an internal thread adapted to the external thread of the connection portion is provided in the adaptation groove;

a guide part is disposed in the first accommodation groove, at least one guide groove adapted to the guide part is provided on the first side face for the transmission part to move along the guide part, and the guide part extends along the first direction; and the second end face faces the response part and is in contact with the response part, and the second end face is configured to push the response part to move along the second direction when the second end face moves along the first direction.

6. The transmission adjustment structure of claim 5, wherein an included angle between the second end face and a virtual plane is between 25° and 75°, and the virtual plane is perpendicular to the second direction.

7. The transmission adjustment structure of claim 5, wherein a third gasket is disposed between the first end face and the second limit plate.

8. The transmission adjustment structure of claim 5, wherein the guide part comprises at least one convex portion disposed on a sidewall of the first accommodation groove, and the at least one convex portion extends along the first direction; and the at least one guide groove in one-to-one correspondence with the at least one convex portion is provided on the first side surface, and each convex portion is located in a corresponding guide groove.

9. The transmission adjustment structure of claim 8, wherein a fourth gasket is disposed between the sidewall of the guide groove and the corresponding convex portion, and the fourth gasket extends along the first direction.

10. The transmission adjustment structure of claim 8, wherein the guide part comprises two of the convex portions, and the two convex portions are disposed oppositely in the third direction.

11. The transmission adjustment structure of claim 5, wherein the shell further comprises a second accommodation groove, one end of the second accommodation groove is communicated with the first accommodation groove, the other end of the second accommodation groove is provided with a third limit plate, and a guide hole is formed on the third limit plate;

the response part is located in the second accommodation groove, and the response part comprises a first portion and a second portion connected to the first portion, and the first portion and the second portion are disposed along the second direction;

the first portion is in contact with the second end face of the transmission part, and the first portion is configured to be movable in the second direction in response to movement of the second end face in the first direction; and the second portion is configured to be movable along the second direction to be protruded or retracted from the guide hole.

12. The transmission adjustment structure of claim 11, wherein the response part further comprises an elastic component; and the elastic component is disposed outside the second portion, and the elastic component is located between the first portion and the third limit plate.

13. The transmission adjustment structure of claim 11, wherein a surface of the first portion in contact with the second end face is a cambered surface.

14. The transmission adjustment structure of claim 1, wherein the shell comprises a first sub-shell and a second sub-shell that are detachable and disposed along the third direction, at least one first connection portion is provided at an outer side of the first sub-shell, a first connection hole is formed on the first connection portion, at least one second connection portion in one-to-one correspondence with the at least one first connection portion is provided at an outer side of the second sub-shell, and a second connection hole is formed on the second connection portion;

the transmission adjustment structure further comprises at least one connection part corresponding to the at least one first connection hole; and the at least one connection part passes through the first connection hole and the second connection hole to fix the first sub-shell and the second sub-shell.

15. The transmission adjustment structure of claim 1, wherein at least one connection structure is disposed on the shell, and the at least one connection structure is configured to be connected and fixed to the casing.

16. A casing, comprising a body portion and at least one transmission adjustment structure located on the body portion, wherein the transmission adjustment structure is the transmission adjustment structure of claim 1.

17. The casing of claim 16, wherein the body portion comprises a bottom plate and a sidewall connected to the bottom plate, the sidewall is located at one side of the bottom plate and disposed along an edge of the bottom plate; and a first through hole exposing the adjustment hole is provided at a position on the sidewall corresponding to the adjustment hole.

18. A tiled display device, comprising the casing of claim 16, and a plurality of sub-display panel assemblies disposed on the casing.

19. The casing of claim 16, wherein the shell comprises a limit groove, the limit groove comprising a first limit plate and a second limit plate that are disposed oppositely, and a sidewall located between the first limit plate and the second limit plate, the rotation part comprises an adjustment portion and a connection portion connected to the adjustment portion, the adjustment portion is located in the limit groove;

the adjustment hole is located on the first limit plate of the limit groove to expose at least portion of the adjustment portion; and a first via hole is formed on the second limit plate of the limit groove, and the connection portion extends along the first direction through the first via hole.

20. The casing of claim 19, wherein a cross-section of one end of the adjustment portion close to the first limit plate parallel to the first limit plate is in an annular shape, and the annular shape has an inner contour and an outer contour;

an orthographic projection of the inner contour on a plane on which the first limit plate is located is located in a region in which the adjustment hole is located; and an orthographic projection of the outer contour on the plane on which the first limit plate is located covers the adjustment hole.

* * * * *